US006654592B2

(12) United States Patent
Friman

(10) Patent No.: US 6,654,592 B2
(45) Date of Patent: Nov. 25, 2003

(54) METHOD AND ARRANGEMENT FOR ADJUSTING OUTPUT POWER OF A TRANSMITTER POWER SUPPLY

(75) Inventor: Esa Friman, Haukipudas (FI)

(73) Assignee: Nokia Corporation, Espoo (FI)

(*) Notice: Subject to any disclaimer, the term of this patent is extended or adjusted under 35 U.S.C. 154(b) by 384 days.

(21) Appl. No.: 09/744,417

(22) Filed: Jan. 22, 2001

(65) Prior Publication Data

US 2003/0013421 A1 Jan. 16, 2003

Related U.S. Application Data

(63) Continuation of application No. PCT/FI00/00550, filed on Jun. 20, 2000.

(30) Foreign Application Priority Data

Jun. 24, 1999 (FI) .................................................. 991446

(51) Int. Cl.$^7$ .............................. H04B 1/38; G05F 1/10
(52) U.S. Cl. ..................... 455/127; 455/117; 455/571; 323/234; 323/244
(58) Field of Search ................................ 455/571, 572, 455/573, 574, 127.5, 127.6, 127.7, 127.1–127.2, 343.1–343.6, 117, 69, 522; 323/224, 231, 234, 244

(56) References Cited

U.S. PATENT DOCUMENTS

| 4,097,863 | A | * | 6/1978 | Chambers .................... 342/175 |
| 4,599,523 | A | * | 7/1986 | Pless et al. .................... 307/41 |
| 5,337,006 | A | | 8/1994 | Miyazaki ..................... 330/130 |
| 5,703,766 | A | | 12/1997 | Sutterlin et al. ............... 363/35 |
| 5,826,170 | A | | 10/1998 | Hirschfield et al. ......... 455/13.4 |
| 6,061,577 | A | * | 5/2000 | Andrieu et al. ............. 455/572 |

FOREIGN PATENT DOCUMENTS

JP 04284600 A 10/1992

* cited by examiner

*Primary Examiner*—Duc Nguyen
(74) *Attorney, Agent, or Firm*—Squire, Sanders & Dempsey L.L.P.

(57) ABSTRACT

The invention relates to a method and an arrangement implementing the method for adjusting output power of a transmitter power supply, in which method the output power of the power supply is measured and the output power of the power supply is adjusted on the basis of the measured output power. In the method, the output power of the transmitter power supply is adjusted on the basis of the transmission power of the transmitter such that a power supply control unit receives from the transmitter a synchronization chopping that synchronizes the operation between the transmitter and the power supply control unit, and the power supply control unit receives from the transmitter the information on the transmission power of the transmitter.

19 Claims, 3 Drawing Sheets

METHOD AND ARRANGEMENT FOR ADJUSTING OUTPUT POWER OF A TRANSMITTER POWER SUPPLY

This application is a combination of internation application No. PCT/FI00/00550, filed Jun. 20,2000.

FIELD OF THE INVENTION

The invention relates to a method and an arrangement for adjusting output power of a transmitter power supply, the transmitter being typically a transmitter of a base station.

BACKGROUND OF THE INVENTION

Transmitters used in radio communication comprise a power supply, which supplies a transmitter with the power it requires. Situations often occur where the transmission power of the transmitter varies rapidly. These rapid variations in the transmission power of the transmitter cause rapid variations of charge in the output of the transmitter power supply. In a prior art solution, the output power of a transmitter power supply is measured, and on the basis of this measurement, a chopper controlling the operation of the power supply is controlled by a power supply control unit. Adaptations to variations of charge require relatively many chopper periods, due to which the prior art solution does not enable the adaptation to rapid variations of charge. Increasing the chopper frequency would accelerate the adaptation but it would also cause the problem that the efficiency of the power supply easily impairs too much. For example, if the chopper frequency is doubled, the power loss of the power supply will be doubled as well. A problem in the prior art solutions is also that the response of parallel connected power supplies is difficult to control.

BRIEF DESCRIPTION OF THE INVENTION

It is thus an object of the invention to provide a method and an apparatus implementing the method to solve the above problems. This is achieved by a method of adjusting output power of a transmitter power supply. In the method, the output power of the power supply is measured and the output power of the power supply is adjusted on the basis of the measured output power. The output power of the transmitter power supply is adjusted on the basis of the transmission power of the transmitter such that a power supply control unit receives from the transmitter a synchronisation chopping that synchronizes the operation between the transmitter and the power supply control unit, and the power supply control unit receives from the transmitter the information on the transmission power of the transmitter.

The invention also relates to an arrangement for adjusting output power of a transmitter power supply. The arrangement comprises a transmitter power supply comprising a chopper and a power supply control unit in feedback between the power supply output and input to adjust the output power of the power supply on the basis of the measured output power of the power supply. The power supply control unit is arranged to adjust the output power of the power supply on the basis of the transmission power of the transmitter such that the power supply control unit is arranged to receive from the transmitter a synchronisation chopping that synchronizes the operation between the transmitter and the power supply control unit, and the power supply control unit is arranged to receive from the transmitter the information on the transmission power of the transmitter.

The preferred embodiments of the invention are disclosed in the dependent claims.

The invention is based on the idea that the power supply control unit receives from the transmitter a synchronisation chopping and the information on the transmission power of the transmitter. The synchronisation chopping synchronizes the operation between the transmitter and the power supply control unit. On the basis of the above and of the output power of the power supply, measured from the power supply output, the power supply control unit adjusts the output power of the transmitter power supply.

The method and arrangement of the invention provide a plurality of advantages. The output power of the transmitter power supply is adapted to the respective transmission power of the transmitter. A significant advantage of the invention is also the adaptation to rapid changes in the transmission power of the transmitter, i.e. to variations of charge in the output of the transmitter power supply. In the solution according to the invention, the response of the power supply is not dependent on the clock frequency of the power supply control unit, due to which the clock frequency of the power supply control unit can be low. This is why the efficiency achieved by means of a power supply is considerably better than in the prior art solutions. An advantage of the invention is also that the response of parallel power supplies can be easily controlled.

BRIEF DESCRIPTION OF THE DRAWINGS

In the following the invention will be described in greater detail in connection with the preferred embodiments, with reference to the attached drawings, in which.

DETAILED DESCRIPTION OF THE INVENTION

Variations in the transmission power of transmitters used in radio connections cause variations of charge in the output of a transmitter power supply. Correspondingly, rapid variations in the transmission power of a transmitter cause rapid variations of charge in the output of the transmitter power supply. The operation of the power supply should be adapted to these variations. In the rapid variations of charge, the transmission power of the transmitter changes five times faster than the chopper frequency of the power supply. The most common chopper frequencies in power supplies are between 100 and 200 kHz. The invention described in the following enables the adaptation of the operation of the transmitter power supply to rapid variations of charge in the output of the power supply as well.

Figure 1:
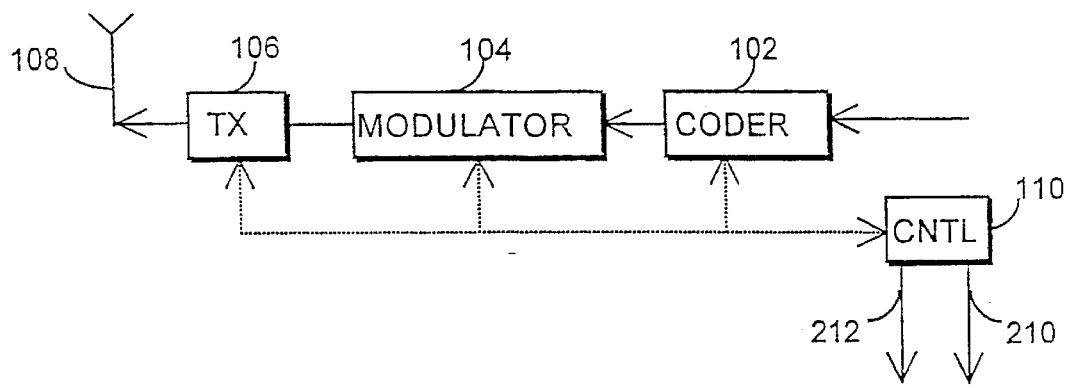
FIG. 1 is a block diagram of an arrangement for adjusting output power of a transmitter power supply.

FIG. 1 is an example of a structure of a transmitter according to the invention. A signal to be transmitted 100 is delivered to a coder 102, which performs a desired coding, typically a channel coding. The coded signal is further delivered to a modulator 104, in which the signal is modulated by using a desired method of modulation. The modulated signal is delivered to a transmitter block 106, in which the signal is amplified and filtered. The transmitter block may be an RF amplifier or a linear amplifier, for example. The signal is transmitted by means of an antenna 108. The transmitter also comprises a controller 110 controlling the operation of different components of the transmitter. In practice, the transmitter also comprises other elements, such as amplifiers and converters. These elements are not described herein, since it is obvious for a person skilled in the art how to use them in appropriate situations. The coder 102 and the modulator 104 can be implemented in a manner known by a person skilled in the art. The controller is preferably implemented by means of a processor and suitable software or by means of separate logic circuits.

Figure 2:
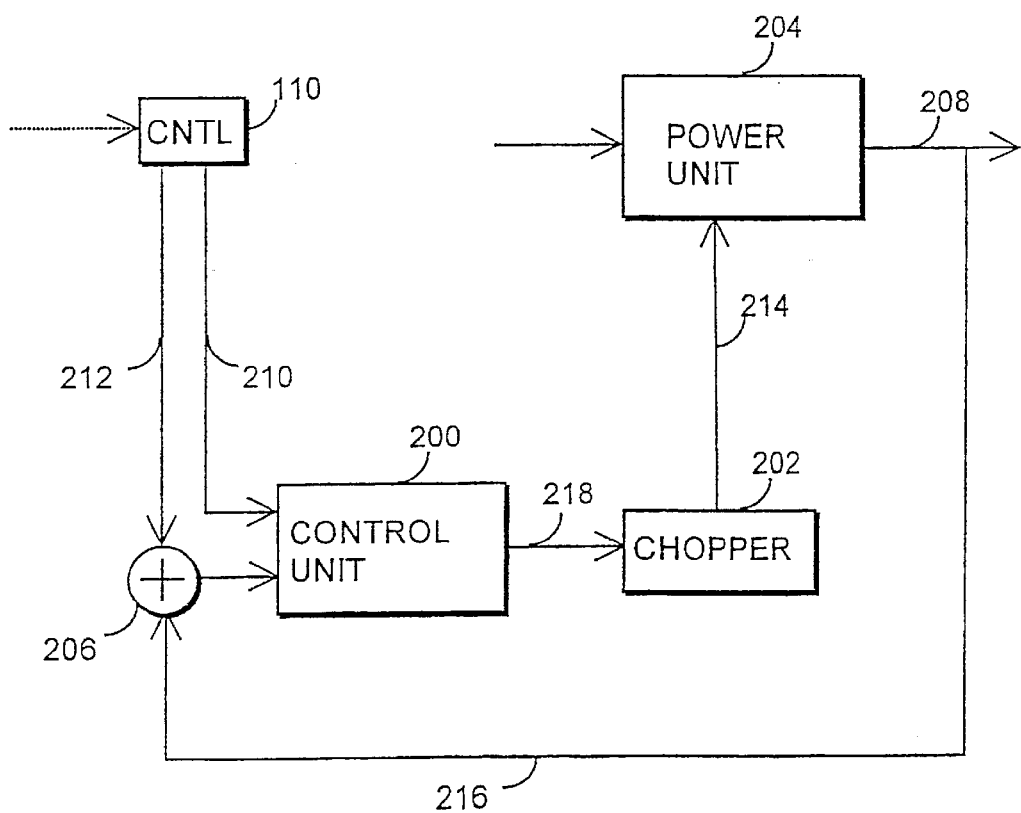
FIG. 2 is a block diagram of a transmitter.
Figure 3:
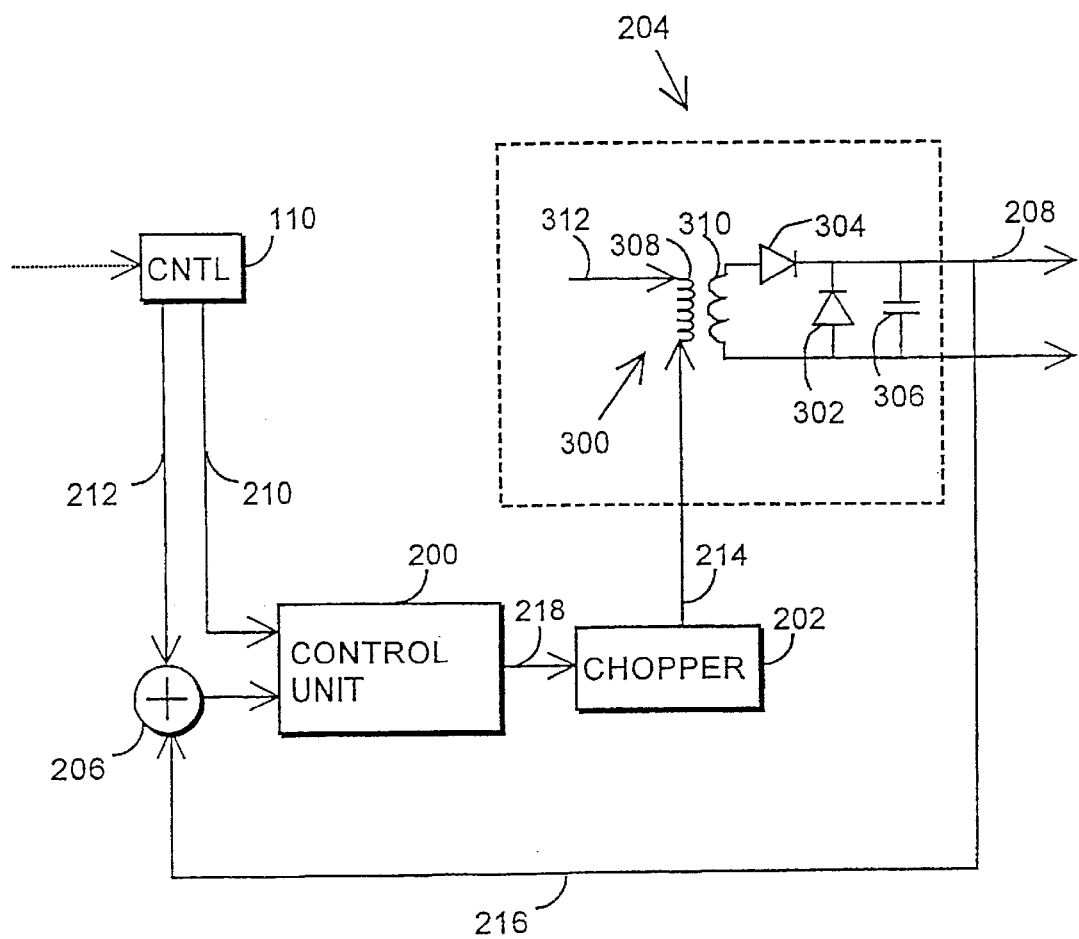
FIG. 3 shows a power supply.
Figure 4A:
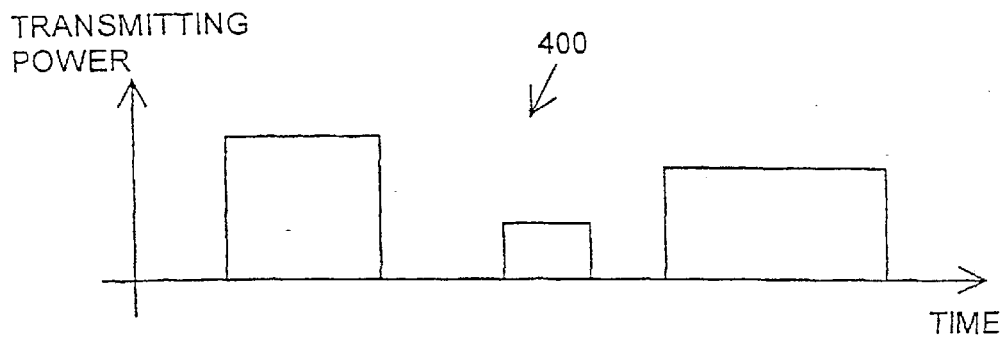
FIGS. 4A to 4D are pulse diagrams of a real time synchronized adjustment of output power of a power supply.
Figure 4B:
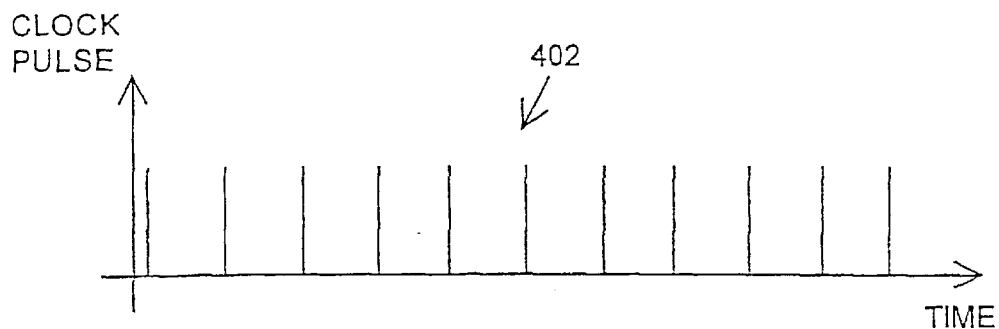
Figure 4C:
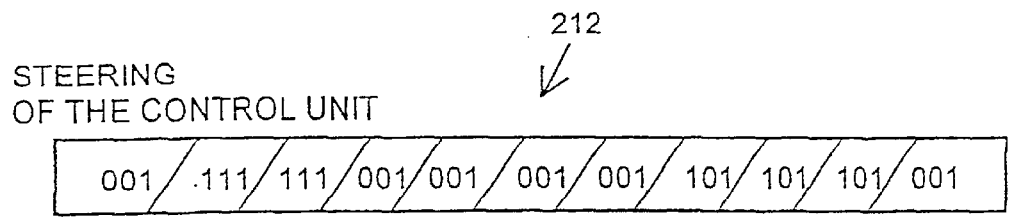
Figure 4D:
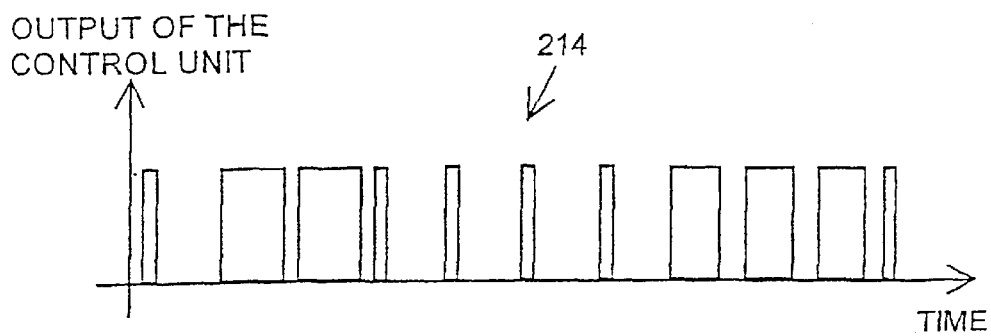

FIG. 2 is a block diagram according to the invention of an arrangement for adjusting output power of a transmitter power supply. The arrangement comprises a controller 110 of the transmitter, a transmitter power supply comprising a power supply control unit 200, a chopper 202 and a power unit 204. In addition, the arrangement usually comprises a summer 206. The power supply can be a current supply or a voltage supply, for example. The power unit is an implementation according to one of the above power supply alternatives, for example in case of a current supply, an implementation as shown in FIG. 3. The transmitter is a base station transmitter, for example, and the power supply control unit is typically a pulse width modulator. The chopper is usually, especially when it deals with the above mentioned frequencies from 100 to 200 kHz, a chopper with at least one FET transistor. Other chopper implementations are an IGBT implementation (Insulated Gate Bibolar Transistor) and a bibolar transistor implementation. The above chopper implementations, including FET transistor implementations, may also comprise one or more other components, such as a diode.

In the method according to the arrangement of FIG. 2, currentmode or voltage-mode output 208 of the power supply, more specifically the output of the power unit 204 of the power supply, is measured. The measurement result obtained from the measurement is transmitted to the power supply control unit 200. Besides the above measurement result obtained from the power supply output, the power supply control unit obtains from the transmitter a synchronisation chopping 210 and the information on the transmission power 212 of the transmitter. The synchronisation chopping synchronizes the operation between the transmitter and the power supply control unit. When the transmitter is switched on, the operation of the power supply control unit, and thereby by means of the power supply control unit the operation of the entire power supply is synchronized to the operation of the transmitter, for example according to the synchronisation chopping in the digital parallel mode. The information on the transmission power 212 of the transmitter, which may also be chopping in the digital parallel mode, informs the power supply control unit 200 thereof, which power level the transmitter uses for transmission at which moment of time. On the basis of the above choppings 210, 212 and of the output power of the power supply, measured from the power supply output 208, the power supply control unit controls by means of its output chopping 218 the operation of the chopper 202 to adjust the output power of the power supply. The power supply control unit 200 is typically a pulse-width modulator, which controls the pulse ratio of the output control chopping 214 of the power supply formed of the power supply control unit and the chopper to adjust the output power of the power supply. The pulse ratio refers to a ratio of the time during which the signal is active, i.e. in the logic state 1, to the time during which the signal is passive, i.e. in the logic state 0. A more detailed description of the pulse ratio can be found in connection with FIGS. 4A to 4D. The power supply control unit 200 may also be a frequency modulator, which controls the chopper 202 frequency to adjust the output power of the power supply, or a phase modulator, which controls the phase of the chopper 202 to adjust the output power of the power supply.

In the method according to the arrangement of FIG. 2, the information obtained from the transmitter on its transmission power 212 provides the power supply control unit 200 with information on the coarse adjustment of the power supply output 208, and the power information measured from the power supply output 208 provides the power supply control unit 200 with information on the fine adjustment of the power supply output 208. The information on the transmission power 212 of the transmitter, concerning the coarse adjustment, is transmitted via feedforward to the power supply control unit 200. This information on coarse adjustment is fine-adjusted in the power supply control unit by means of the power information that is measured from the power supply output 208 and transmitted from the power supply output via feedback 216 to the power supply control unit. The above mentioned information on the transmission power of the transmitter 100, transmitted via feedforward, and the power information on the power supply output, transmitted via feedback, can be summed in the summer 206 before the power supply control unit in order to form a desired signal for the power supply control unit. For example, if the power supply control unit 200 is a pulse-width modulator, the signal controls the pulse ratio of the output control chopping 214 of the power supply formed of the pulse-width modulator and the chopper 202, in such a manner that the power level of the power supply output 208 is adjusted as desired, i.e. it adapts to rapid variations in the transmission power of the transmitter, for example. By means of the synchronisation chopping, too, the pulse ratio of the output control chopping 214 of the power supply formed of the power supply control unit and the chopper can be immediately changed.

In FIG. 1, the synchronisation chopping 210 and the chopping 212 containing the information on the transmission power of the transmitter are formed by means of the controller 110. From the controller 110, the choppings 210, 212 are transmitted to the power supply control unit 200. The synchronisation chopping is formed for example such that the information on the transmission frequency of the transmitter is transmitted from the transmitter block 106 to a control block, and according to this information the control block forms the synchronisation chopping to synchronize the operation between the power supply and the transmitter by means of the power supply control unit. The information on the transmission power 212 of the transmitter is transmitted to the controller 110 also from the transmitter block 106, for instance.

FIG. 3 shows a power supply, whose power unit 204 comprises a converter 300, two diodes 302, 304 and a capacitor 306. In addition, the power supply comprises a power supply control unit 200 and a chopper 202, which are in feedback 216 between a power supply output and input. The power supply usually also comprises a summer 206. The power supply converter 300 comprises a primary coil 308 and a secondary coil 310. The power supply shown in FIG. 3 is one implementation of the chopper power supply. The operation of chopper power supplies is based on the properties of the coil. As alternating current passes in the coil, it generates an alternating magnetic field around the coil. After the alternating current is switched off, the coil tends to continue the travel of the alternating current due to the energy of the alternating magnetic field around the coil. The control chopping 214 of the power supply output, which is formed by the power supply control unit and the chopper, arrives at the primary coil 308 of the converter 300. The input power 312 of the power supply also arrives there. The converter converts the input power to some other power according to the lap ratio between the primary and secondary coils of the converter. In the secondary coil the output power 208 of the power supply is thus generated, which is measured. The obtained measurement result is transmitted via feedback 216 to the power supply control unit, possibly by means of the summer 206, in order to fine-adjust the coarse-adjusting chopping obtained from the transmitter, the chopping containing the information on the transmission power of the transmitter.

FIGS. 4A to 4D are pulse diagrams of a real time synchronized adjustment of output power of a power supply. The pulses illustrated in FIG. 4A to 4D are a pulse 400 according to the variation of the transmission power of the transmitter, i.e. according to the variation of charge in the power supply output 208, in FIG. 4A, an internal clock chopping 402 of the power supply control unit 200 in FIG. 4B, control chopping of the power supply control unit 200, represented as bit numbers, in FIG. 4C and control chopping 214 of the power supply output in FIG. 4D. The control chopping of the power supply control unit is formed of the information on the transmission power 212 of the transmitter and of the power information measured from the power supply output 208. The power supply control unit and the transmitter operation are synchronized by the synchronisation chopping. Thus, the internal clock chopping of the power supply control unit is synchronized to the changes in the transmission power of the transmitter. In the solution of the invention, the frequency of the clock chopping 402 of the power supply control unit can be relatively low, since the response of the power supply output 208 is not dependent on the frequency of the clock chopping. Thus, the output power of the power supply can be adjusted such that it immediately adapts to rapid variations in the transmission power of the transmitter. Due to this, the efficiency of the power supply is considerably better than in the prior art solutions. In FIGS. 4A to 4D, the power supply control unit 200 is a pulse-width modulator and the output chopping 218 of the power supply control unit controls the chopper 202, from which the desired pulse ratios are obtained for the control chopping 214 of the power supply output. When it deals with a pulse-width modulator, the frequency usually remains the same. The pulse ratio of the chopper is defined such that the duration of the conducting state of the pulse is compared to the duration of the non-conducting state of the pulse. In the digital technique the pulse is typically in the conducting state, i.e. in the logic state 1, when the voltage value is higher than a threshold voltage, e.g. higher than 0.8 V, and the pulse is in the non-conducting state, i.e. in the logic state 0, when the voltage value is lower than a threshold voltage, e.g. lower than 0.2 V. The above signal states can also be named in such a manner that in the conducting state the signal is active and in the non-conducting state the signal is passive.

The transmitter and power source are described above by way of example, and therefore other variations of transmitters and power supplies thereof are possible in the solutions according to the invention. The solution of the invention can for example be applied to the adjustment of a transmitter power supply of an RF output stage or a GSM/DCS output stage.

Although the invention has been described above with reference to the example according to the attached drawings, it is obvious that the invention is not restricted thereto, but may be modified in a variety of ways within the inventive idea disclosed in the attached claims.

What is claimed is:

1. A method of adjusting output power of a transmitter power supply, in which method the output power of the power supply is measured and the output power of the power supply is adjusted on the basis of the measured output power, characterized by adjusting the output power of the power supply on the basis of the transmission power of the transmitter such that:

a power supply control unit (200) receives from the transmitter a synchronisation chopping (210) that synchronizes the operation between the transmitter and the power supply control unit, and the power supply control unit (200) receives from the transmitter the information on the transmission power (212) of the transmitter.

2. A method as claimed in claim 1, characterized by the power supply control unit (200) controlling a chopper (202), by which the output power of the power supply is controlled.

3. A method as claimed in claim 2, characterized by adjusting the output power of the power supply by a pulse ratio of the chopper, which ratio is controlled by the power supply control unit.

4. A method as claimed in claim 3, characterized by controlling the pulse ratio of the chopper (202) by means of the power supply control unit (200) on the basis of the information on the transmission power (212) of the transmitter.

5. A method as claimed in claim 3, characterized by controlling the pulse ratio of the chopper (202) by means of the power supply control unit (200) on the basis of the synchronisation chopping (210).

6. A method as claimed in claim 1, characterized by the power supply control unit (200) performing a coarse adjustment on the basis of the information which concerns the transmission power (210) of the transmitter and which is received from the transmitter.

7. A method as claimed in claim 1, characterized by the power supply control unit (200) performing a fine adjustment on the basis of the power value measured from the power supply output (208).

8. A method as claimed in claim 1, characterized by the information on the transmission power (212) of the transmitter being digital parallel-mode chopping.

9. A method as claimed in claim 1, characterized by adjusting the output power of the power supply of a base station transmitter stage by means of the method.

10. An arrangement for adjusting output power of a transmitter power supply, which arrangement comprises a transmitter power supply comprising a chopper (202) and a power supply control unit (200) in feedback (216) between the power supply output and input to adjust the output power of the power supply on the basis of the measured output power of the power supply, characterized in that the power supply control unit (200) is arranged to adjust the output power of the power supply on the basis of the transmission power of the transmitter such that the power supply control unit (200) is arranged to receive from the transmitter a synchronisation chopping (210) that synchronizes the operation between the transmitter and the power supply control unit, and the power supply control unit (200) is arranged to receive from the transmitter the information on the transmission power (212) of the transmitter.

11. An arrangement as claimed in claim 10, characterized in that the power supply control unit (200) is arranged to control the chopper (202) to adjust the output power of the power supply.

12. An arrangement as claimed in claim 11, characterized in that the power supply control unit (200) is arranged to control the pulse ratio of the chopper (202) in order to adjust the output power of the power supply.

13. An arrangement as claimed in claim 12, characterized in that the power supply control unit (200) is arranged to control the pulse ratio of the chopper (202) on the basis of the information on the transmission power (212) of the transmitter.

14. An arrangement as claimed in claim 12, characterized in that the power supply control unit is arranged to control the pulse ratio of the chopper on the basis of the synchronisation chopping (210).

15. An arrangement as claimed in claim 10, characterized in that the arrangement comprises a pulse-width modulator functioning as the power supply control unit (200).

16. An arrangement as claimed in claim 10, characterized in that the power supply control unit (200) is arranged to perform a coarse adjustment on the basis of the information which concerns the transmission power (212) of the transmitter and which is received from the transmitter.

17. An arrangement as claimed in claim 10, characterized in that the power supply control unit (200) is arranged to perform a fine adjustment (210) on the basis of the output power measured from the power supply output (208).

18. An arrangement as claimed in claim 10, characterized in that the transmitter is a base station transmitter stage.

19. An arrangement as claimed in claim 10, characterized in that the chopper (202) comprises at least one FET transistor.

* * * * *